April 25, 1961
E. F. ABRAMS ET AL
2,981,515
MOTION TRANSMITTING DEVICE
Filed Aug. 29, 1957
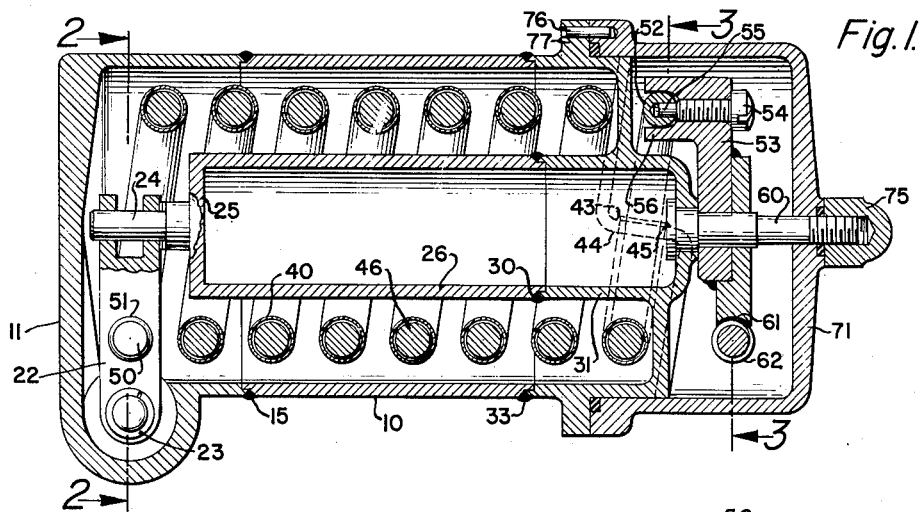
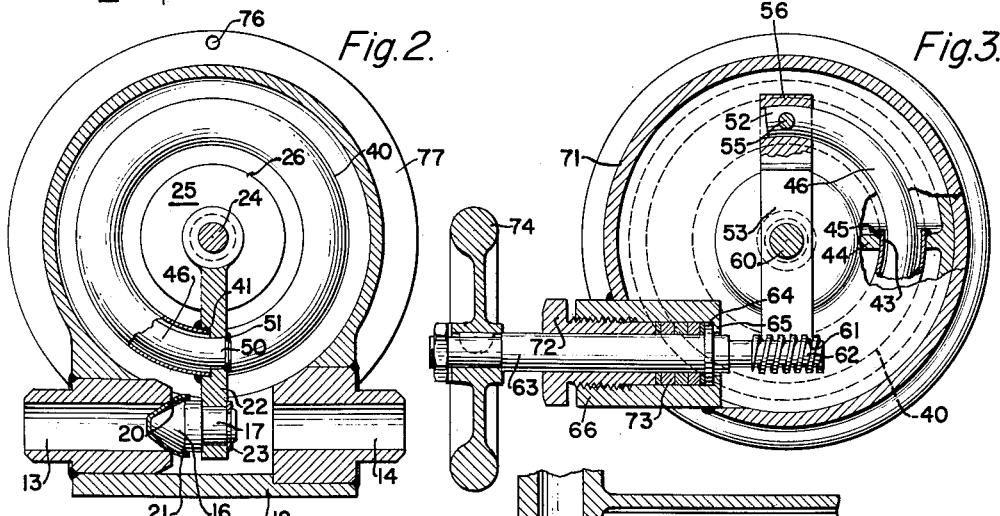
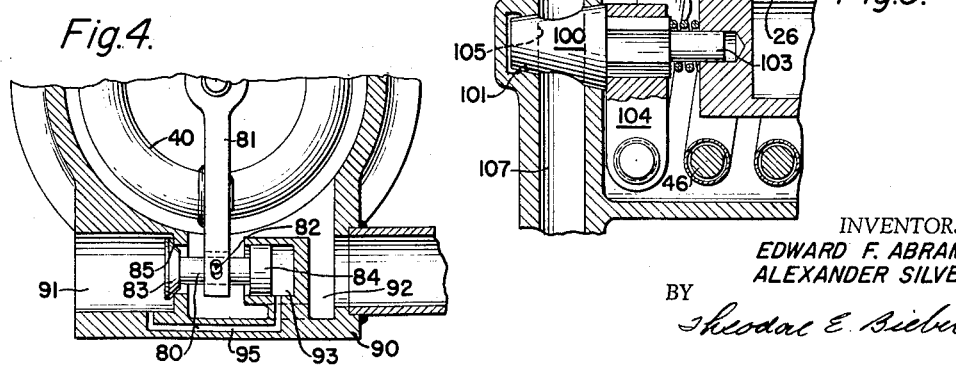
INVENTORS:
EDWARD F. ABRAMS,
ALEXANDER SILVER,
BY Theodore E. Bieber
Attorney.

United States Patent Office 2,981,515
Patented Apr. 25, 1961

2,981,515
MOTION TRANSMITTING DEVICE

Edward F. Abrams, Los Angeles, and Alexander Silver, East Woodland Hills, Calif., assignors to The Garrett Corporation, Los Angeles, Calif., a corporation of California Filed Aug. 29, 1957, Ser. No. 680,944

16 Claims. (Cl. 251—229)

This invention pertains to motion transmitting devices and more particularly to a motion transmitting device which is adapted to transmit motion to move an element which is disposed within a hermetically sealed enclosure.

In many applications in industry it is necessary to position or move an element which is disposed within a hermetically sealed enclosure. For example, in many chemical plants it is necessary to provide hermetically sealed valves which require some means for positioning the movable valve element from the exterior of the valve body without destroying the integrity of the hermetically sealed valve body. Many similar applications exist throughout industry for hermetically sealed valves and for positioning control elements within hermetically sealed enclosures, as, for example, in complex industrial plants.

This invention would solve the above problems by providing a motion transmitting device which is capable of transmitting motion to position an element disposed in the interior of a hermetically sealed enclosure without destroying the integrity of the enclosure. The motion transmitting device consists of a coiled tubular member, one end of which extends into the enclosure. The end of the tubular member which extends into the enclosure is hermetically sealed, while the outer surface of the tubular member is hermetically sealed to the wall of the enclosure where it penetrates the wall. A second coiled member or element is disposed within the first tubular member with one end of the second member being secured to the tubular member adjacent the sealed end thereof. The other end of the second member is free of the tubular member so that any torque applied to the free end will be translated into a torque movement of the sealed end of the tubular member and the end of the second member secured thereto.

The above-described motion transmitting device is easily adapted to a variety of uses but was designed to position the movable element or the obturator of various types of valves. It is especially adapted to this type of operation since most movable valve elements require a small movement. Of course, the amount of movement transmitted by the motion device of this invention can be varied by varying the diameter of the coils of the tubular member or the number of coils used, or using mechanical linkages to change or amplify the motion within the hermetically sealed enclosure.

Accordingly, it is the principal object of this invention to provide a novel motion transmitting device which is capable of positioning a movable element within a hermetically sealed enclosure without destroying the integrity of the enclosure.

Another object of this invention is to provide a unique hermetically sealed motion transmitting device utilizing a coiled tubular member and a second coiled member which is disposed within the tubular member.

Another object of this invention is to provide a unique torque transmitting device having a first coiled tubular member with a second coiled member disposed within the first coiled tubular member. One end of the first member is fastened to the adjacent end of the second member with the other end of the first member being fixed and the other end of the second member being free to move so that rotation of the free end of the second member will be transformed into a rotation of the other ends of the two members.

Another object of this invention is to provide a novel design of a hermetically sealed valve.

Another object of this invention is to provide a hermetically sealed valve which is actuated by a motion device utilizing a coiled tubular member with a second member disposed within the coiled tubular member.

A still further object of this invention is to provide a hermetically sealed valve utilizing a coiled tubular member having a solid coiled member disposed within the tubular member as the valve operating means.

These and further objects and advantages of this invention will be more apparent to those skilled in the art from the following detailed description when taken in conjunction with the attached drawing, in which:

Fig. 1 is a longitudinal section of a poppet type valve which is posiitoned by a motion transmitting device constructed according to this invention;

Fig. 2 is a vertical section taken along line 2—2 of Fig. 1 and showing the poppet valve and the sealed end of the motion transmitting device;

Fig. 3 is a section taken along line 3—3 of Fig. 1 and showing the mechanism used for moving the free end of the coiled member which is disposed within the tubular member;

Fig. 4 is a section showing a modified form of the valve incorporating a balanced poppet; and Fig. 5 is a section showing another modified form of the valve incorporating a rotating plug type valve.

Referring to Figs. 1, 2 and 3, there is shown a hermetically sealed valve having an outer tubular case 10 which is joined to a cup-shaped base member 11 by means of an annular weld 15. The base member 11 is provided with a tubular valve body 12 having aligned inlet and outlet openings 13 and 14 respectively, as shown in Fig. 2. A suitable poppet valve 16 is disposed in the valve body 12 so as to engage an annular valve seat 20 formed on the valve body. If desired, the valve poppet 16 may be provided with a flexible sealing member 21 which surrounds its outer surface to insure a tight seal between the poppet and the valve seat. The stem 17 of the valve poppet which extends axially from its right-hand side is secured to the end of the poppet operating arm 22 by any desired means, such as a snap ring 23, or the like. The opposite end of the arm 22 is rotatably mounted on a stub shaft 24 which extends from the left end wall 25 of the inner tubular case 26 of the valve. The right end of the inner tubular case 26 is hermetically sealed to the end closure 31 of the valve by means of an annular weld 30, or the like. The outer tubular case 10 is also hermetically sealed to the end closure 31 by means of an annular weld 33, or the like.

Disposed in the annular space between the inner and outer tubular members of the valve body is a coiled tubular member 40. The tubular member 40 is preferably formed of a high strength material capable of flexing without distorting such as stainless steel or metals having similar or suitable characteristics. The extreme left end 41 of the coiled tubular member 40 is hermetically closed by an annular weld which seals the outer surface of the tubular member to the arm 22 and the end of the solid rod element or member 46 described below. The right end 43 of the tubular member 40 is hermetically sealed to the radial wall 44 of the top cover 31 where it penetrates the wall by means of an annular weld 45. The coiled rod member 46 is disposed within the coiled tubular member 40 with one end 50 of the rod extending to the extreme left-hand end of the coiled tubular member 40. The rod member is preferably formed of a relatively stiff material capable of transmitting torque, such as a solid rod of stainless or similar material. While the member 46 is preferably a solid rod member, a tubular member could also be used providing it had sufficient stiffness. The end 50 of the rod member is hermetically sealed to the poppet operating arm 22 by any desired means, such as an annular weld 51. By hermetically sealing the end 50 of the solid rod member 46 to the arm 22, the left end of the tubular member 40 is hermetically closed or sealed. This also provides a convenient method for fastening the end 50 of the rod member to the tubular member so that they will rotate in unison when the opposite end of the rod member is rotated.

The right-hand end 52 of the rod member 46 is pivotally secured to one end of an actuating arm 53 by any desired means, such as a cap screw 54. The cap screw 54 is threaded into the arm 53 and has a dog point 55 which extends into an opening formed in the end of the rod member. The actuating arm 53 is provided with a forked end 56 which extends partially around the end of the rod member so as to guide and align the end of the rod member as it is rotated. The actuating arm 53 is rotatably mounted on a stub shaft 60 which extends to the right from the end closure 31. The shaft 60 may be a separate member secured in a central opening in the top cover 31 by any desired means, such as a press fit, or the like.

A segment 61 of a gear is formed on the opposite end of the actuating arm 53 and engages a worm 62 formed on the end of the valve operating shaft 63, as shown in Fig. 3. The operating shaft is rotatably mounted in a bushing 66 which is secured to an opening formed in the top cover 71 by welding, or the like. The operating shaft 63 is provided with an outwardly projecting flange 64, one surface of which engages an inwardly projecting shoulder 65 formed on the bushing 66, the other surface engaging the valve packing 73, which is held in place by the packing nut 72 threaded into the open end of the bushing 66. A handwheel 74 is secured to the end of the operating shaft 63 for rotating the rod member to operate the valve. The top cover 71 is secured to the remainder of the valve body by means of a nut 75 which threads over the end of the shaft 60, on which the actuating arm 53 is mounted. Dowel pins 76 are provided between the mating flanges of the top cover 71 and an outwardly projecting flange 77 formed on the end closure 31. The dowel pins 76 serve both as a locating means for the top cover 71 and as a means to prevent rotation of the top cover 71 when the valve is operated. It is to be understood that while a worm and worm wheel have been shown as the actuating means, other well known means may also be used, such as solenoids or piston type actuators.

In order to operate the above-described valve, one merely has to rotate the handwheel 74, which will rotate the actuating arm 53. The rotation of the actuating arm 53 will cause the right-hand end 52 of the rod member 46 to rotate or move circumferentially about the axis of the shaft 60. This torque movement of the end 52 of the rod member will be translated into a torque movement of the left-hand end 50 of the rod member. This torque movement of the end 50 of the rod member will cause the valve actuating arm 22 to rotate about the axis of the shaft 24 to open or close the valve. When the end 50 of the rod member rotates, it will tend to either increase or decrease the diameter of the various coils of the tubular member 40, depending upon the direction of movement. Sufficient clearance should be provided between the rod member 46 and the tubular member 40 so that the tubular member 40 may be stretched or compressed enough to provide sufficient rotation of the ends of the rod member without creating undue friction between the rod member and the tubular member.

From the above-described valve and its operation, it can be seen that this invention provides a motion device which is capable of positioning an element within the hermetically sealed enclosure without destroying the integrity of the enclosure. Although the invention is shown and described as pertaining to a hermetically sealed valve, the coiled tubular member 40 with the rod member 46 positioned within the tubular member could be used to move other elements located within a hermetically sealed enclosure. The use of the tubular member 40 for effecting a hermetic seal around the movable rod 46 has several advantages over previous methods. One of these advantages is the fact that a tubular shape is an efficient one for pressure vessels and thus results in the minimum wall thickness to withstand any given pressure differential across the wall. It is also possible to accurately design a tubular shape and thus predict its performance with great accuracy, which is not possible with previous devices, as, for example, bellows. This invention also has the advantage of withstanding extremely high temperatures and pressures since the additional stresses generated in the tubular member when the valve is operated are relatively small.

In some cases it may be necessary to add more coils to the tubular member 40 in order to reduce the tension which is generated in the tubular member when a greater degree of movement is required. The actual size of the tubular member 40 and the number of turns required, of course, depend upon many variables and once the variables are known, the design of the tubular member is relatively simple.

Referring now to Fig. 4, there is shown a modified form of the valve shown in Fig. 1 which incorporates a balanced poppet type valve element 80. The balanced poppet element is attached to one end of a modified valve actuating arm 81 by any desired means, such as the pin 82 which is secured to the stem of the valve element 80 and engages an elongated slot in the forked end of the arm. A valve disc 83 is formed on the valve element 80 and engages a valve seat 85 formed in a modified valve body 90. The valve body 90 is provided with an aligned inlet 91 and outlet 92. The valve poppet is balanced by a piston 84 attached to the right-hand end of the valve element 80, with the piston 84 being disposed for axial movement in a balancing chamber 93. The chamber 93 is connected to the inlet 91 of the valve by an equalizing passageway 95 so as to balance the forces acting on the poppet valve. The remainder of the operating mechanism is substantially the same as that shown in Fig. 1 and described above. When the handwheel 74 is turned, it will rotate the modified arm 81 to either close or open the valve.

Fig. 5 illustrates a plug type valve which is operated by the same mechanism shown and described in Figs. 1, 2 and 3. In this valve a tapered plug 100 is disposed so as to engage a tapered valve seat 101 formed in a modified valve body 102. The valve plug is provided with a shaft 103 which rotates in an opening formed in the modified end wall of the inner tubular housing 26 of the valve shown in Fig. 1. A small compression spring 110 is provided for urging the valve plug into engagement with the valve seat. A modified arm 104 is secured to the end of the tubular member 40 and the rod member 46 substantially as shown in Fig. 1. The other end of the modified arm 104 is secured to the valve plug 100 by any desired means in order to rotate the valve plug 100 when the handwheel 74 is turned. The valve plug 100 is provided with an opening 105 whose axis is normal to the axis of rotation of the valve plug for controlling the communication between the inlet 106 and the outlet 107 of the valve.

The plug type valve shown in Fig. 5 requires that the valve plug 100 be rotated through ninety degrees of movement in order to move the valve plug from a fully closed to a fully open position. This degree of movement can easily be obtained from the mechanism shown in Fig. 1 by properly designing the tubular member 40 and the rod member 46, as was explained above.

While but one preferred embodiment of this invention has been shown and described in detail, many modifications and improvements will occur to those skilled in the art within the broad spirit and scope of the invention.

We claim:

1. A hermetically sealed valve comprising: a hermetically sealed valve body having an inlet and outlet; a valve seat formed in said valve body; a valve element disposed to engage said valve seat to control communication between said inlet and said outlet, said valve element being secured to an arm member rotatably supported in said valve body; a coiled tubular element disposed in said valve body, one end of said coiled tubular element being hermetically sealed to said arm and the other end of said coiled tubular element projecting through an opening in said valve body; the outer surface of said coiled tubular element being hermetically sealed to said valve body adjacent the opening therein; a coiled member disposed within said coiled tubular element, one end of said coiled member being coupled to said arm member; and means for moving the other end of said coiled member to rotate said arm member.

2. A hermetically sealed valve comprising: a hermetically sealed valve body having an inlet and outlet; a valve seat formed in said valve body; a valve element disposed to engage said valve seat to control communication between said inlet and said outlet, said valve element being fastened to a first arm rotatably supported in said valve body; a coiled tubular element disposed in said valve body, one end of said coiled tubular element being hermetically sealed to said arm and the other end of said coiled tubular element projecting through an opening in said valve body, the outer surface of said coiled tubular element being hermetically sealed to said valve body adjacent the opening therein; a coiled member disposed within said coiled tubular element, one end of said coiled member being fastened to said arm member; a second arm member fastened to the other end of said coiled member, said second arm member being disposed outside of said valve body to rotate about the same axis as said first arm member; and means for rotating said second arm to position said valve element.

3. A hermetically sealed valve comprising: a hermetically sealed valve body having an inlet and outlet; an annular valve seat formed in said valve body; a poppet valve element disposed in said body to engage said valve seat to control communication between said inlet and outlet; an arm member fastened to said poppet valve, said arm member being rotatably mounted in said valve body; a coiled tubular member having at least one turn disposed in said valve body, one end of said tubular member being hermetically sealed to said arm and the other end of said tubular member extending through an opening in said valve body, the outer surface of said tubular member adjacent said other end being hermetically sealed to said valve body; a coiled element positioned within said tubular element, one end of said coiled element being fastened to said arm; and means for moving the other end of said coiled element.

4. A hermetically sealed valve comprising: a valve body having an inlet and outlet; a valve element disposed in said valve body to control communication between said inlet and outlet; a coiled tubular member disposed in said valve body with one end extending through an opening in said valve body, the outer surface of said tubular member being hermetically sealed to said valve body and the other end of said tubular member being hermetically sealed; a coiled element disposed within said tubular element, the end of said coiled element adjacent the sealed end of the tubular member being fastened to said tubular member; means for moving the other end of said coiled element; and additional means for transmitting the motion of the sealed end of said tubular member to said valve element to control the position thereof while retaining the integrity of the hermetic seals.

5. A device for transmitting motion from the outside to the inside of a hermetically sealed enclosure comprising: a coiled tubular member having a circular cross-section, one end of said tubular member extending into the enclosure through an opening formed therein, said one end being hermetically sealed, the outer surface of said tubular member adjacent said opening being hermetically sealed to the enclosure; a coiled rod element positioned on the inside of said tubular member, the end of said rod element adjacent the sealed end of said tubular member being fastened thereto; and means for moving the other end of said rod member while retaining the integrity of the hermetically sealed enclosure.

6. A hermetically sealed valve comprising: a hermetically sealed valve body having an inlet and outlet; an annular valve seat formed in said valve body; a poppet valve element disposed in said body to engage said valve seat to control communication between said inlet and outlet; an arm member fastened to said poppet valve, said arm member being rotatably mounted in said valve body; a coiled tubular member having at least one turn disposed in said valve body with the longitudinal axis of the coils of said tubular member coaxial with the axis of rotation of said arm member, one end of said tubular member being hermetically sealed to said arm and the other end of said tubular member extending through an opening in said valve body, the outer surface of said tubular member adjacent said other end being hermetically sealed to said valve body; a coiled element positioned within said tubular element, one end of said coiled element being fastened to said arm; and means for moving the other end of said coiled element while retaining the integrity of the hermetically sealed relationship.

7. A hermetically sealed valve comprising: a valve body having an inlet and outlet; a cylindrical valve seat formed in said valve body; a cylindrical valve plug disposed in said valve body to engage said valve seat, said valve plug having an opening formed therein for controlling communication between said inlet and outlet; a coiled tubular member disposed in said valve body with one end extending through an opening in said valve body, the outer surface of the other end of said tubular member being hermetically sealed to said valve body and said one end of said tubular member being hermetically sealed; a coiled element disposed within said tubular element, one end of said coiled element being secured to said one end of the tubular member; means for moving the other end of said coiled element; and additional means for connecting said one end of said tubular member to said valve plug for rotating said valve plug.

8. A device for transmitting motion from the outside to the inside of a hermetically sealed enclosure comprising: a coiled tubular member having a circular cross-section, one end of said tubular member extending into the enclosure through an opening therein and the outer surface of said tubular member being hermetically sealed to the enclosure adjacent the opening therein; said one end of said tubular member being hermetically sealed to a first arm member; said first arm member being rotatably mounted in the enclosure for rotation about an axis coaxial with the longitudinal axis of the coils of said tubular member; a coiled rod disposed within said tubular member, one end of said rod being fastened to said one end of said tubular member, the other end of said rod being fastened to a second arm member; said second arm member being rotatably mounted on the outside of the enclosure for rotation about an axis coaxial with the longitudinal axis of the coils of said tubular member; and means for rotating said second arm member thereby rotating said first arm member.

9. A hermetically sealed valve comprising: a hermetically sealed valve body having an inlet and outlet; an annular valve seat formed in said valve body; a balanced poppet valve element disposed in said body to engage said valve seat to control communication between said inlet and outlet; an arm member fastened to said poppet valve, said arm member being rotatably mounted in said valve body; a coiled tubular member having at least one turn disposed in said valve body with the longitudinal axis of the coils of said tubular member coaxial with the axis of rotation of said arm member, one end of said tubular member being hermetically sealed to said arm and the other end of said tubular member extending through an opening in said valve body, the outer surface of said tubular member adjacent said other end being hermetically sealed to said valve body; a coiled element positioned within said tubular element, one end of said coiled element being fastened to said arm; and means for rotating the other end of said coiled element.

10. A device for transmitting motion from the outside to the inside of a hermetically sealed enclosure comprising: a coiled tubular member having a circular cross-section, one end of said tubular member extending into the enclosure through an opening therein; the outer surface of said tubular member adjacent the opening in the enclosure being hermetically sealed to the enclosure; said one end of said tubular member being hermetically sealed to a first arm member; said first arm member being rotatably mounted in the enclosure for rotation about an axis coaxial with the longitudinal axis of the coils of said tubular member; a coiled rod disposed within said tubular member, one end of said rod being fastened to said arm member, the other end of said rod being pivotally secured to one end of a second arm member; said second arm member being rotatably mounted on the outside of the enclosure for rotation about an axis coaxial with the longitudinal axis of the coils of said tubular member; a segment of a gear formed on the other end of said second arm member; and a worm rotatably disposed on the outside of the enclosure to engage said gear segment.

11. A hermetically sealed valve comprising: a valve body having a hollow inner member closed at one end; a tubular member surrounding said hollow member and spaced therefrom, the end of said tubular member adjacent the closed end of said inner member being closed, the other end of said tubular member being hermetically joined to said inner member; a valve seat formed in said tubular member; inlet and outlet openings formed in said tubular member; a movable valve element disposed in the space between said inner member and said tubular member to engage said valve seat for controlling communication between said inlet and outlet openings; a stub shaft projecting from the closed end of said inner member; an arm member rotatably mounted on said stub shaft; a coiled tubular member disposed in the space between said inner member and said tubular member, one end of said coiled tubular member being hermetically secured to said arm, and the other end of said coiled tubular member projecting through the wall of said tubular member, the outer surface of said coiled tubular member being hermetically sealed to the wall of said tubular member; a coiled member disposed inside said coiled tubular member, one end of said coiled member being secured to said arm; means for moving the other end of said coiled member to rotate said arm; and additional means for utilizing the rotation of said arm to position said movable valve element.

12. A hermetically sealed valve comprising: a valve body having a hollow cylindrical inner member, hermetically closed at one end; a tubular member surrounding said inner member and radially spaced therefrom; end cap means hermetically sealed to said tubular member for closing the end of said tubular member adjacent the closed end of said inner member; a wall member hermetically sealed to the other end of both said inner member and said tubular member; inlet and outlet openings formed in said end cap means; a movable valve element disposed to control communication between said inlet and outlet; a stub shaft projecting from the closed end of said inner member; an arm rotatably mounted on said stub shaft; a coiled tubular member disposed in the space between said inner and said tubular member, one end of said coiled tubular member being hermetically sealed to said arm and the other end projecting through an opening in said wall member, the outer surface of said coiled tubular member being hermetically sealed to said wall member; a coiled member disposed on the inside of said coiled tubular member, one end of said coiled member being secured to said arm; means for moving the other end of said coiled member to rotate said arm; and additional means utilizing the rotation of said arm to position said movable valve element.

13. A hermetically sealed valve comprising: a valve body having a hollow cylindrical inner member closed at both ends; a tubular member surrounding said inner member and radially spaced therefrom; an end cap hermetically sealed to one end of said tubular member, said end cap being axially spaced from one end of said inner member; a wall member hermetically sealed to the other end of said tubular member and said inner member; an inlet and outlet opening formed in said end cap; a valve seat formed in said end cap; a movable valve element disposed to engage said valve seat to control communication between said inlet and outlet; a stub shaft projecting axially from said one end of said inner member, the axis of said stub shaft being aligned with the axis of said inner member; an arm rotatably supported by said stub shaft; said movable valve element being fastened to said arm; a coiled tubular member disposed in the space between said inner member and said tubular member with the axis of the coils aligned with the axis of said inner member, one end of said coiled tubular member being hermetically sealed to said arm member and the other end of said tubular member projecting through said wall member, the outer surface of said coiled tubular member being hermetically sealed to said wall member; a coiled member disposed within said coiled tubular member, one end of said coiled member being secured to said arm and the other end of said coiled member projecting from the other end of said coiled tubular member; a second stub shaft projecting axially from the other end of said tubular member, the axis of said second stub shaft being aligned with the axis of said inner member; a second arm rotatably supported by said second stub shaft; said other end of said coiled member being pivotally fastened to said second arm; and actuating means for rotating said second arm to position said movable valve element.

14. A device for transmitting motion from the outside to the inside of a hermetically sealed enclosure comprising: a coiled tubular member having an inner end extending into the enclosure through an opening therein and an outer end on the outside of said enclosure; said inner end of said tubular member being hermetically sealed; an annular portion of said tubular member adjacent said outer end being hermetically sealed to the wall of the enclosure; a coiled elongated element disposed inside of said coiled tubular member; and an inner end of said element disposed adjacent said inner end of said tubular member whereby rotation of the outer end of said element causes rotation of said inner ends of both the element and tubular member.

15. A valve comprising: a valve body having an inlet and an outlet; a valve element disposed in said valve body to control communication between said inlet and outlet;

a coiled tubular member disposed in said valve body, one end of said coiled member being hermetically sealed to said valve element and the opposite end of said member being hermetically sealed about an opening through said valve body; and a coiled elongated element disposed within said tubular member and rotatable relative thereto, one end of said coiled element being connected to said valve element, the opposite end of said coiled element extending through said valve body opening and being rotatable to effect rotation of said valve element.

16. A motion transmitting device comprising: a coiled tubular member; a coiled elongated element disposed inside of said tubular member and rotatable relative thereto; means mechanically connecting one end of said element to the adjacent end of said tubular member; means fixedly mounting the end of said tubular member opposite to said adjacent end; and means for rotating an end of said element to cause movement of the other end of said element.

References Cited in the file of this patent

UNITED STATES PATENTS

| | | |
|---|---|---|
| 492,192 | Creque | Feb. 21, 1893 |
| 1,537,411 | Cox | May 12, 1925 |
| 1,575,850 | Limpert | Mar. 9, 1926 |
| 1,644,825 | Fulton | Oct. 11, 1927 |
| 1,904,530 | Rathbun | Apr. 18, 1933 |
| 2,173,096 | Campbell | Sept. 19, 1939 |
| 2,317,422 | Thomsen | Apr. 27, 1943 |